United States Patent [19]

Kunitake et al.

[11] Patent Number: 5,446,803
[45] Date of Patent: Aug. 29, 1995

[54] IMAGE SIGNAL PROCESSING APPARATUS

[75] Inventors: Setsu Kunitake; Koh Kamizawa; Yutaka Koshi, all of Kanagawa, Japan

[73] Assignee: Fuji Xerox Co., Ltd., Tokyo, Japan

[21] Appl. No.: 365,168

[22] Filed: Dec. 28, 1994

Related U.S. Application Data

[63] Continuation of Ser. No. 27,904, Mar. 8, 1993, abandoned.

[30] Foreign Application Priority Data

Mar. 9, 1992 [JP] Japan ................................. 4-50694

[51] Int. Cl.⁶ .............................................. G06K 9/32
[52] U.S. Cl. .................................. 382/290; 382/203; 382/296; 345/126
[58] Field of Search .................. 382/44, 46, 27, 25; 345/126; 395/137

[56] References Cited

U.S. PATENT DOCUMENTS

| | | | |
|---|---|---|---|
| 4,558,461 | 12/1985 | Schlang | 382/46 |
| 4,636,783 | 1/1987 | Omachi | 382/46 |
| 4,829,452 | 5/1989 | Kang et al. | 382/46 |
| 4,953,230 | 8/1990 | Kurose | 382/46 |
| 5,027,227 | 6/1991 | Kita | 382/46 |
| 5,093,653 | 3/1992 | Ikehita | 382/46 |
| 5,111,514 | 5/1992 | Ohta | 382/44 |
| 5,233,168 | 8/1993 | Kulik | 382/46 |
| 5,335,290 | 8/1994 | Cullen et al. | 282/46 |
| 5,359,677 | 10/1994 | Katsurada et al. | 382/46 |

FOREIGN PATENT DOCUMENTS

61-187082A 8/1986 Japan .

Primary Examiner—Joseph Mancuso
Attorney, Agent, or Firm—Finnegan, Henderson, Farabow, Garrett & Dunner

[57] ABSTRACT

Disclosed is an image signal processing apparatus in which the position of an input image can be corrected easily irrespective of the shape of the input image by use of attribute information obtained from image information. Image information read by an image information reading unit is stored in an image information storage unit, and rectangular blocks are extracted sequentially from the image information by a block extracting unit. Shapes of images in the extracted blocks are analyzed by a block shape analyzing unit, and the analyzed block shapes are stored in a block shape storage unit. An image signal from the image information storage unit is displayed on an image signal display unit, and the analyzed block shapes from the block shape storage unit are displayed on another display unit. Instructions on position are given on the image signal display unit by a position instruction unit along the shape analysis result of image signals in the positions corresponding to the extracted blocks, to thereby correct the inclination of the input image signal.

12 Claims, 5 Drawing Sheets

IMAGE SIGNAL PROCESSING APPARATUS

This application is a continuation of application Ser. No. 08/027,904, filed Mar. 8, 1993, now abandoned.

BACKGROUND OF THE INVENTION

1. Field of the Invention

The present invention relates to an image signal processing apparatus for reading an original image through an image signal input device such as a scanner or the like to thereby obtain image information, and particularly relates to an image signal processing apparatus for correcting the displacement of image information at the time of reading the image information irrespective of the outline of a rectangular image.

2. Description of the Prior Art

Most of image signals fetched by an image signal input device such as a scanner or the like have inclination or displacement caused by user's manipulation or mechanical structure. Some methods have been proposed for correcting such displacement or the like.

For example, Japanese Patent Unexamined Publication No. Sho. 61-187082 discloses a method for correcting inclination of image information by assigning a central point of rotation and an aim point of rotation to a rectangular image obtained through reading an original document.

Figure 8:
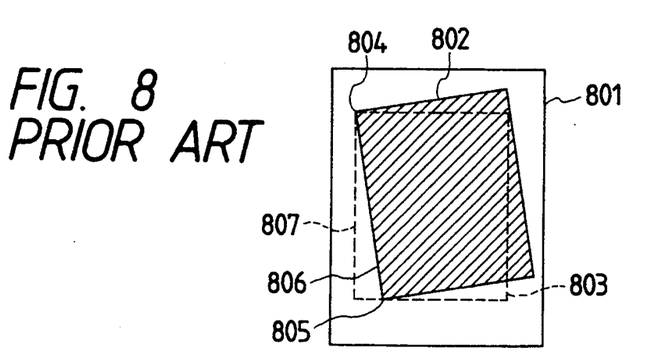
FIG. 8 is a diagram illustrating correction operation in a conventional image signal processing apparatus.

FIG. 8 shows a procedure of correction in the conventional example disclosed in the above publication, in which the reference numeral 801 designates an image signal display means, 802 designates an inclined input image, that is, an input image to be corrected, displayed on the image signal display means 801, and 803 designates a predetermined area in which the input image 802 is to be positioned after it is corrected.

In the conventional example disclosed in the above publication, an image signal fetched through an image signal input device is developed on an image memory while the image signal is inclined. In order to correct the inclination, first, a user uses a light pen or a cursor to indicate an origin 804 of rotation and a designated point 805 of the input image 802 for coinciding the input image 802 with the predetermined area 803. Thereafter a rotation section computes the angle between a straight line 806 connecting the origin 804 and the designated point 805 and a left end line of the predetermined area 803, computes vertical and horizontal quantities of movement required for coinciding the input image 802 with the predetermined area 803, and shifts image data in the vertical and horizontal directions on the image memory on the basis of the computation to thereby correct the inclination of the image.

In the conventional example disclosed in the above publication, in order to perform rotation processing, it is necessary for a user to confirm through his eyes the positions of angles and the inclination of sides of the input image 802 having a rectangular shape to indicate the origin 804 and the designated point 805. If the input image is not rectangular, therefore, it is very difficult, or impossible in some cases, to indicate the origin 804 and the designated point 805.

Further, such correction can be applied to only the whole of an input image, and cannot be applied to any cut piece of the image. That is, indeed, the inclination of an input image can be judged from the inclination of the frame of the input image if the whole of its original image is inputted, but if a portion of the input image is displayed, it is impossible to judge the inclination of the input image from the frame of this partial input image.

Further, there has been a problem that it is impossible to apply such correction to the case of a large quantity of correction. That is, if the quantity of correction (displacement or inclination from an original document) is so large to exceed beyond a read area of a scanner or the like, for example, if it is impossible to indicate the origin 804, the method disclosed in the above publication cannot be applied to such a case.

SUMMARY OF THE INVENTION

It is therefore an object of the present invention to solve the foregoing problems in the prior art.

It is another object of the present invention to provide an image signal processing apparatus in which the position of an input image can be corrected easily irrespective of the shape of the input image by use of attribute information obtained from image information.

In order to attain the foregoing objects, the present invention provides an image signal processing apparatus including image information reading means for reading image information, image signal display means for displaying an image signal of the image information read by the image information reading means, blocking means for superimposing a plurality of blocks constituted by a predetermined number of picture elements over the image information read by the image information reading means, block shape analyzing means for analyzing shapes of images in the respective blocks, display means for displaying the block shapes analyzed by the block shape analyzing means, and position instruction means for giving instructions on position of the image signal by use of a display of the image signal display means, wherein the image signal is displayed on the image signal display means, and an inclination of the input image signal is corrected with reference to a result of analysis of shapes in positions corresponding to the respective blocks.

Also, the present invention provides an image signal processing apparatus including image information reading means for reading image information, image information storage means for storing the image information, block extracting means for extracting rectangular blocks constituted by a predetermined number of picture elements sequentially from the image information read by the image information reading means, block shape analyzing means for analyzing shapes of images in the extracted blocks, block shape storage means for storing the analyzed block shapes, image signal display means for displaying an image signal of the image information read from the image information storage means, position instruction means for giving instructions on positions on the image signal display means, and display means for displaying the analyzed block shapes read from the block shape storage means, wherein the image signal is displayed on the image signal display means, and an inclination of the input image signal is corrected in accordance with a result of analysis of shapes of image signals in positions corresponding to the extracted blocks.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Figure 1:
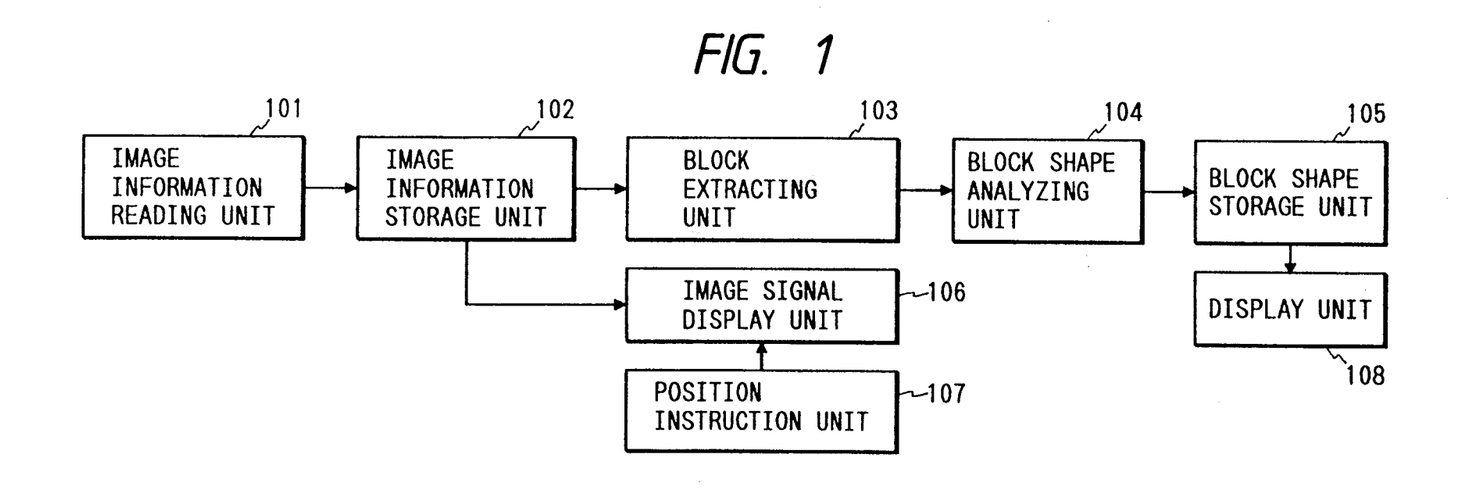
FIG. 1 is a diagram illustrating the principle configuration of an image signal processing apparatus for explaining the operation of the present invention.

First, the operation of the present invention will be described with reference to a principle configuration of an image signal processing apparatus shown in FIG. 1. As shown in FIG. 1, the image signal processing apparatus according to the present invention has an image information reading unit 101 for reading image information, an image information storage unit 102 for storing the image information, a block extracting unit 103 for extracting rectangular blocks constituted by a constant number of picture elements, sequentially from the image information read by the image information reading unit 102, a block shape analyzing unit 104 for analyzing shapes of images in the extracted blocks, a block shape storage unit 105 for storing the analyzed block shapes, an image signal display unit 106 for displaying an image signal, a position instruction unit 107 through which a user gives instructions about positions on the image signal display unit 106, and a display unit 108 for displaying the block shapes.

In the above-mentioned configuration, an image to be inputted into the apparatus is read through the image information reading unit 101, and stored in the image information storage unit 102. An image signal corresponding to the inputted image is divided by the block extracting unit 103 into a plurality of rectangular blocks constituted by a predetermined number of picture elements, and after the shapes of the respective blocks are analyzed by the block shape analyzing unit 104, the shape information of all the blocks is stored in the block shape storage unit 105 as information of attributes of the blocks. The shape information of the blocks includes, for example, directions of images belonging to the blocks. If a user recognizes displacement (inclination) of the read image when the image information read through the image information read unit 101 is read from the image information storage unit 102 and displayed on the image signal display unit 106, the user selects an area of the image by the position instruction unit 107 to thereby make the display unit 108 display the shape analysis information of all the blocks in this area. On the basis of this shape analysis, the user inputs a desired shape of the selected portion by use of the position instruction unit 107 to thereby correct the position.

Hereinafter, an embodiment of the present invention will be described with reference to the drawings.

Figure 2:
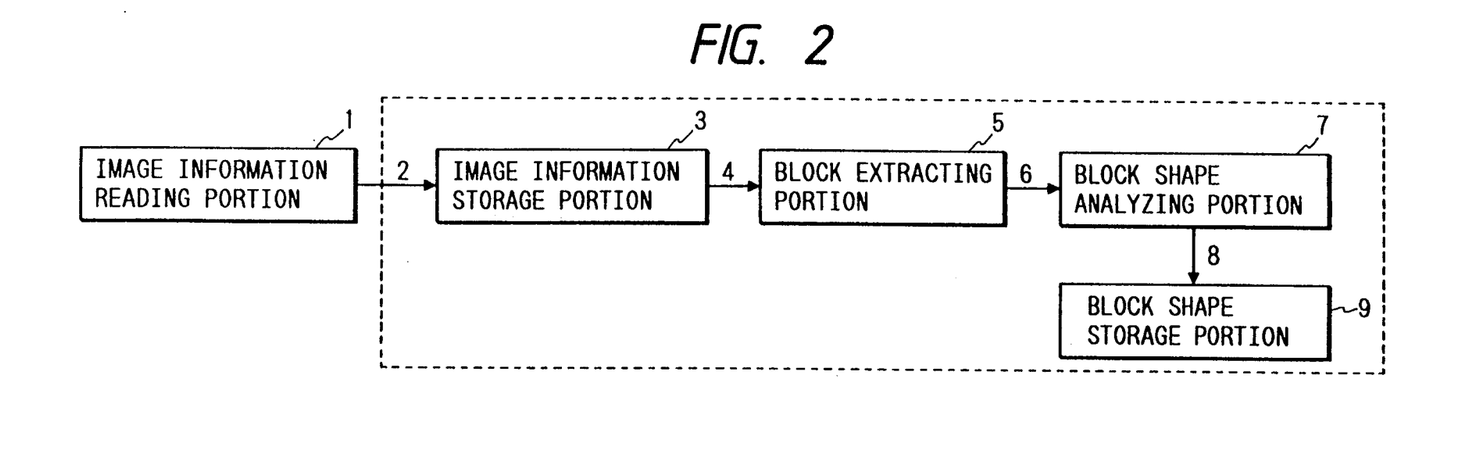
FIG. 2 is a block diagram illustrating the flow of a signal at the time of inputting an image in an image signal processing apparatus according to an embodiment of the present invention.
Figure 3:
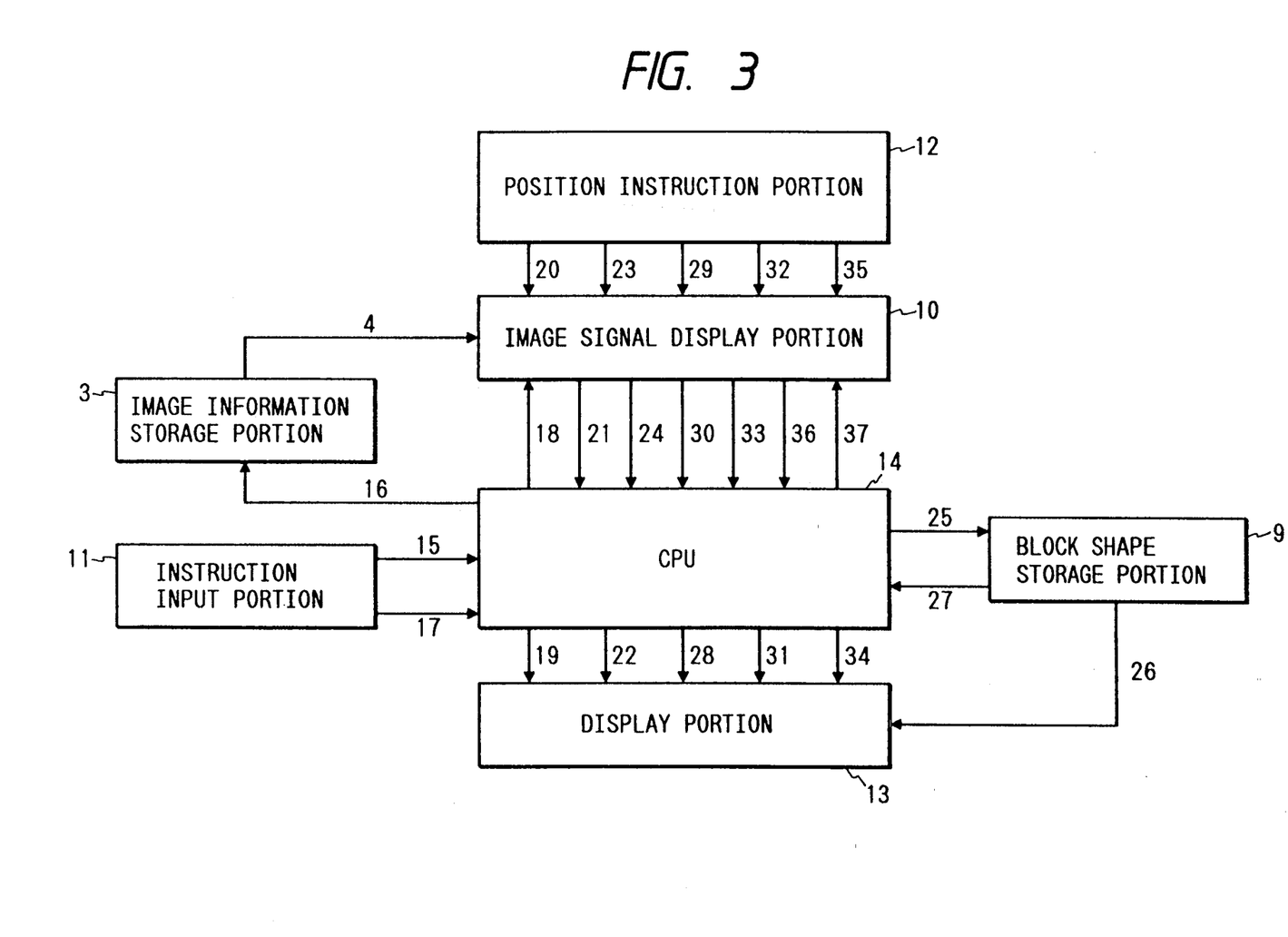
FIG. 3 is a block diagram illustrating the flow of a signal at the time of correction operation in the image signal processing apparatus according to the embodiment of the present invention.

FIG. 2 shows the flow of a signal at the time of inputting an image in an embodiment of the image signal processing apparatus according to the present invention, and FIG. 3 shows the flow of a signal at the time of correction operation.

In FIG. 2, the reference numeral 1 designates an image information reading portion, 2 designates an image read through the image information reading portion 1, 3 designates an image information storage portion such as an image memory or the like for storing image information, 4 designates a read image signal read from the image information storage portion 3, 5 designates a block extracting portion for extracting rectangular blocks from the read image signal 4, the rectangular blocks being constituted by a predetermined number of picture elements, for example, 4×4 or 8×8 picture elements, 6 designates extracted blocks extracted by the block extracting portion 5, 7 designates a block shape analyzing portion for analyzing the shapes of the extracted blocks 6, 8 designates block shape information analyzed by the block shape analyzing portion 7, and 9 designates a block shape storage portion for storing the block shape information 8. For example, the block shape analyzing portion 7 detects the directions of images in the respective blocks, and outputs symbols showing the directions as block shape information.

In FIG. 3, the reference numeral 10 designates an image signal display portion for displaying the image signal 4 read from the image information storage portion 3, 11 designates an instruction input portion through which a user inputs instructions for image display, correction, and so on, 12 designates a position instruction portion for indicating a specific position for correction operation on the image signal display portion 10, 13 designates a display portion for displaying messages for input request and the like to the user, and 14 designates a central processing unit (hereinafter abbreviated to "CPU").

Further, the reference numeral 15 designates an image display instruction signal through which the user instructs the image signal display portion 10 to display an image, 16 designates an image reading instruction signal which is sent from the CPU 14 to the image information storage portion 3, 17 designates an image position correction instruction signal by which the user instructs position correction of an image displayed on the image signal display portion 10, 18 designates a block line display signal for making the image signal display portion 10 display block lines showing borders of the respective blocks, 19 designates a left upper point input request message display instruction signal for making the display portion 13 display a message for requiring the user to input a left upper point of an objective area of position correction, 20 designates a left upper point signal showing the left upper point of the objective area of position correction indicated through the position instruction portion 12 by the user, 21 designates a left upper point coordinate signal showing the coordinates of the left upper point of the objective area of position correction, which is sent to the CPU 14, 22 designates a right lower point input request message display instruction signal for making the display portion 13 display a message for requiring the user to input a right lower point of the objective area of position correction, 23 designates a right lower point signal showing the right lower point of the objective area of position correction indicated through the position instruction portion 12 by the user, 24 designates a right lower point coordinate signal showing the coordinates of the right lower point of the objective area of position correction, which is sent to the CPU 14, 25 designates a block shape display instruction signal for instructing the block shape storage portion 9 to make the display portion 13 display block shapes of all the blocks in the objective area of position correction, 26 designates displayed block shape information to be displayed on the display portion 13, 27 designates a block shape display complete signal for informing the CPU 14 of the fact that the block shape information to be displayed has been sent to the display portion 13, 28 designates a correction origin input request message display instruction signal for making the display portion 13 display a message for requiring the user to indicate the origin of correction, 29 designates an origin instruction signal showing the origin of correction indicated through the position instruction portion 12 by the user, 30 designates an origin coordinate instruction signal showing the coordinates of the origin of correction, 31 designates a before-correction end point input request message display instruction signal for making the display portion 13 display a message for requiring the user to input an end point before correction, 32 designates a before-correction end point instruction signal showing the end point before correction indicated through the position instruction portion 12 by the user, 33 designates a before-correction end point coordinate instruction signal showing the coordinates of the end point before correction, 34 designates an after-correction end point input request message display instruction signal for making the display portion 13 display a message for requiring the user to input an end point after correction, 35 designates an after-correction end point instruction signal showing the end point after correction indicated through the position instruction portion 12 by the user, 36 designates an after-correction end point coordinate instruction signal showing the coordinates of the end point after correction, and 37 designates a corrected image display instruction signal for making the image signal display portion 10 display an image signal after correction. The origin and the end point will be described later.

Figure 7A:
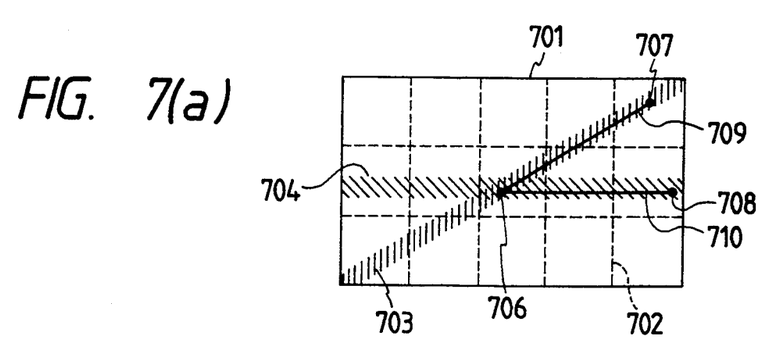
FIG. 7(a) is a diagram illustrating an example of an image signal display portion at the time of correction operation.
Figure 7B:
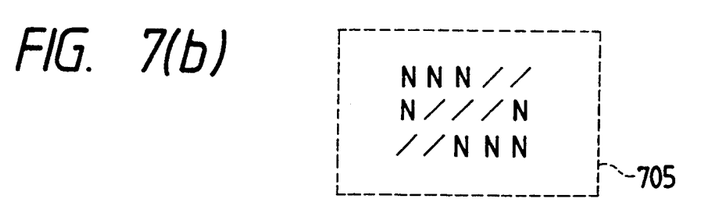
FIG. 7(b) is a diagram illustrating an example of a display portion at the time of correction operation.
Figure 7C:
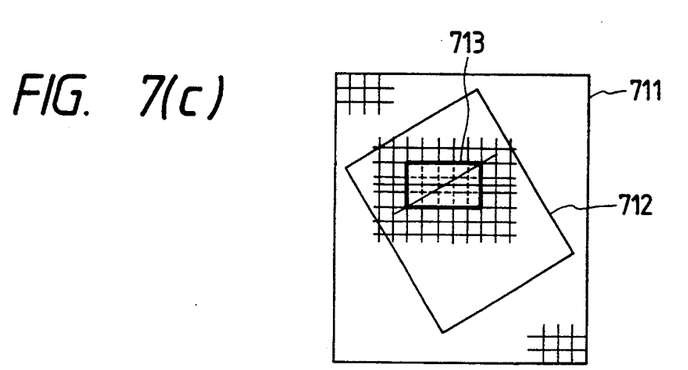
FIG. 7(c) is a diagram illustrating an example of an input image as a whole.

Next the operation will be described. In FIG. 2, the image information 2 read through the image information reading portion 1 is stored in the image information storage portion 3. The read image signal 4 read from this image information storage portion 3 is extracted as the rectangular blocks 6 constituted by a predetermined number of picture elements, sequentially by the block extracting portion 5, and supplied to the block shape analyzing portion 7. The blocks are extracted sequentially all over the read image 2 as shown in FIG. 7(c). In the block shape analyzing portion 7, the shapes of the extracted blocks 6 are analyzed by use of a predetermined analyzing method in which for example inclination of picture elements in each block, template matching, and so on are analyzed, and the block shape information 8 is stored in the block shape storage portion 9.

Figure 4:
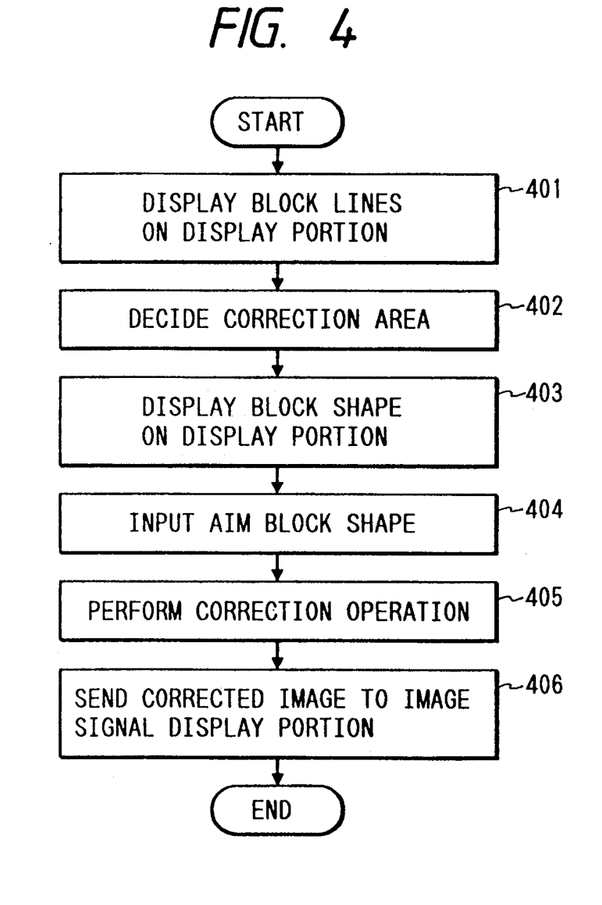
FIG. 4 is a flow chart schematically illustrating the processing of a CPU.

On the other hand, in FIG. 3, if the user inputs, through the instruction input portion 11, instructions for the image signal display portion 10 to display an image, the image display instruction signal 15 is sent to the CPU 14, and the image reading instruction signal 16 for giving instructions to read the image is sent from the CPU 14 to the image information storage portion 3, so that the read image signal 4 is displayed on the image signal display portion 10. If the user gives instructions of position correction through the instruction input portion 11 because of recognizing displacement in the image displayed on the image signal display portion 10, the image position correction instruction signal 17 is sent to the CPU 14, so that correction is started. FIG. 4 shows a schematic flow chart of the correction in CPU 14.

First, the block line display signal 18 for making the image signal display portion 10 display block lines showing borders of respective blocks is sent from the CPU 14 to the image signal display portion 10, so that the image signal display portion 10 displays the block lines (Step 401).

Next, the CPU 14 makes the display portion 13 display a message for requiring the user to indicate an objective area of correction, and receives information of the area indicated through the position instruction portion 12 by the user. Thus the correction area is decided (Step 402). The step to decide the correction area will be described later in detail.

Thereafter, the CPU 14 sends the block shape storage portion 9 the block shape display instruction signal 25 for instructing the block shape storage portion 9 to make the display portion 13 display block shape information of all the blocks belonging to the correction area. If the block line display instruction signal 25 is sent from the CPU 14, the block shape storage portion 9 sends the displayed block information 26 to the display portion 13, displays the block shape information thereon, and supplies the CPU 14 with the block shape display complete signal 27 for informing that the block shape information has been sent to the display portion 13 (Step 403). An example of displaying the block shape information will be described later.

Thereafter, the CPU 14 makes the display portion 13 display a message for requiring the user to input an origin and an end point of correction, and receives coordinate information indicated through the position instruction portion 12 by the user. Thus, an aim block shape is inputted (Step 404). The step to input the aim block shape will be described later in detail.

Next, a predetermined correction operation is performed in the CPU 14 (Step 405). The correction operation will be described later in detail.

Finally, the CPU 14 sends the corrected image display instruction signal 37 for making the image signal display portion 10 display an image signal which has been corrected, and the correction operation is thus finished (Step 406).

Figure 5:
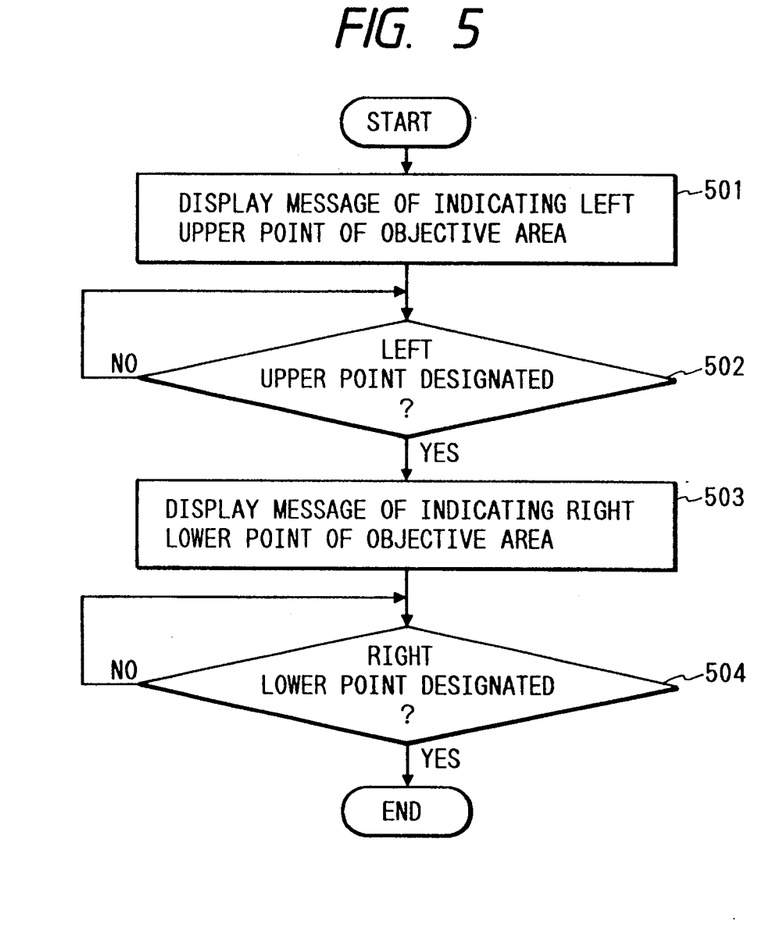
FIG. 5 is a flow chart illustrating a decision step to decide a correction area.

The above-mentioned Step 402 to decide a correction area will be described. FIG. 5 shows the flow of processing in Step 402.

First, the CPU 14 supplies the display portion 13 with the left upper point input request message display instruction signal 19 for making the display portion 13 display a message for a user, "Indicate a left upper point of an objective area to be corrected" (Step 501).

If the user uses the position instruction portion 12 along this instruction to thereby decide a left upper point of an objective area to be corrected, the left upper point signal 20 is sent to the image signal display portion 10, and the left upper point coordinate signal 21 showing the coordinates of this left upper point is sent to the CPU 14, so that the user can confirm this (Step 502).

Next the CPU 14 supplies the display portion 13 with the right lower point input request message display instruction signal 22 for making the display portion 13 display a message for the user, "Indicate a right lower point of the objective area" (Step 503).

If the user uses the position instruction portion 12 along this instruction to thereby decide a right lower point of the objective area to be corrected, the right lower point signal 23 is sent to the image signal display portion 10, and the right lower point coordinate signal 24 showing the coordinates of this right lower point is sent to the CPU 14, so that the user can confirm this (Step 504). Here the objective area of position correction is decided.

Figure 6:
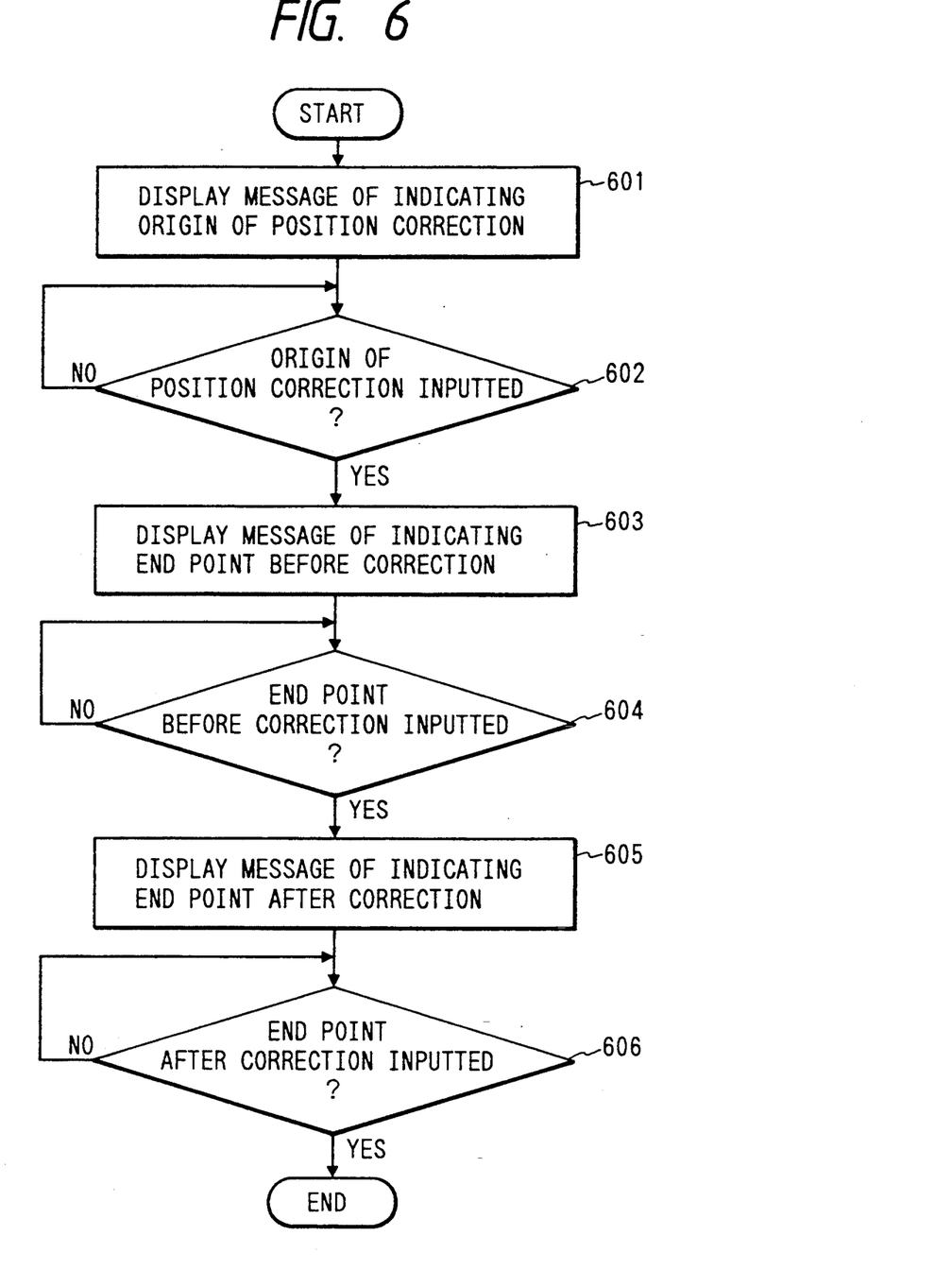
FIG. 6 is a flow chart illustrating an input step to input an aim block shape.

Next, the above-mentioned Step 404 to input an aim block shape will be described with reference to FIG. 6.

First, the CPU 14 supplies the display portion 13 with the correction origin input request message display instruction signal 28 for making the display portion 13 display a message for the user, "Indicate an origin of position correction" (Step 601).

If the user uses the position instruction portion 12 along this instruction to thereby decide an origin of position correction, the origin instruction signal 29 is sent to the image signal display portion 10, and the origin coordinate instruction signal 30 showing the coordinates of this origin is sent to the CPU 14, so that the user can confirm this (Step 602).

Next, the CPU 14 supplies the display portion 13 with the before-correction end point input message display instruction signal 31 for making the display portion 13 display a message for the user, "Indicate an end point before correction" (Step 603).

If the user uses the position instruction portion 12 along this instruction to thereby decide an end point before correction, the end point instruction signal 32 is sent to the image signal display portion 10, and the end point coordinate instruction signal 33 showing the coordinates of this end point is sent to the CPU 14, so that the user can confirm this (Step 604).

Next, the CPU 14 supplies the display portion 13 with the after-correction end point input message display instruction signal 34 for making the display portion 13 display a message for the user, "Indicate an end point after correction" (Step 605).

If the user uses the position instruction portion 12 along this instruction to thereby decide an end point after correction, the end point instruction signal 35 is sent to the image signal display portion 10, and the end point coordinate instruction signal 36 showing the coordinates of this end point is sent to the CPU 14, so that the user can confirm this (Step 606). Thus, the input of aim block shape information after correction by the user is finished.

Next, the correction operation in Step 405 will be described. Here, consider correction by rotating an image. FIGS. 7(a) and 7(b) show an example of images displayed on the image signal display portion 10 and the display portion 13 at the time of correction operation. FIG. 7(c) shows as a model the read image 2 stored in the image information storage portion 3, and a portion of this image information is illustrated in FIG. 7(a).

In FIG. 7(a), the reference numeral 701 designates an objective area to be corrected indicated by the user, 702 designates block lines for associating an image displayed on the image signal display portion 10 and divided into a plurality of blocks, with an image displayed on the display portion 13, 703 designates a straight line in the image displayed on the image signal display portion 10 (a straight line in the image before correction), and 704 designates a straight line corresponding to the straight line 703 in the inputted image (a straight line in the image after correction). In this embodiment, the objective area to be corrected is divided into 5×3 blocks. In FIG. 7(c), the reference numeral 711 designates a read image stored in the image information storage portion 3, 712 designates an inclined original document in the read image 2, and 713 designates an area corresponding to the objective area 701 to be corrected.

The reference numeral 705 in FIG. 7(b) designates an example of shape information of all the blocks in the objective area 701 to be corrected displayed on the display portion 13. The example in FIG. 7(b) shows that the English letter "N" has no special direction in the image in the blocks, and the rightward rising oblique line "/" has a rightward rising direction in the image of the blocks. In this embodiment, this property of direction is used as shape information. The objective area 701 is divided into a plurality of blocks each of which is constituted by, for example, 4×4 or 8×8 picture elements, and the direction of the image is detected in each block.

This property of direction of an image in each block can be obtained by inquiring the distribution of density of a plurality of picture elements constituting an image in each block by use of a method such as a template matching or the like. For example, if the density of picture elements on the diagonal connecting the right upper and left lower of a block is high, and the density of picture elements near the left upper and right lower of the block is low, it is judged that the image in the block is a rightward rising straight line. That is, since it is understood that the image in the block has a rightward rising direction, the above-mentioned symbol "/" is assigned thereto. In the same manner, symbols of longitudinal, transversal, and leftward rising oblique lines are assigned to longitudinal, transversal, and leftward rising directions respectively.

In the example shown in FIG. 7(b), it is understood from the shape information 705 corresponding to the objective area 701 to be corrected that the image in the objective area 701 has a counter-clockwise inclination. Therefore, if the image is rotated clockwise to make the straight line 703 horizontal as an example, the inclination is corrected. The processing of correction will be performed along the following procedure.

In this example, first, the user uses the shape information 705 as material for judgment to thereby indicate a before-correction end point 707 and an after-correction end point 708. That is, the user indicates the respective points so that a correction origin 706 and the after-correction end point 708 are on the same horizontal line. The CPU 14 computes an angle between a straight line 709 connecting the origin 706 with the before-correction end point 707 and a straight line 710 connecting the origin 706 with the after-correction end point 708, computes the vertical and horizontal quantities of movement required for making the straight line 703 in the displayed image coincide with the corresponding straight line 704 in the inputted image, and shifts image data in the objective area 701 in the image information storage portion 3 in the vertical and horizontal directions on the basis of these quantities of movement to thereby realize processing of correction, that is, processing of clockwise rotation in the case of the example in FIGS. 7(a) through 7(c). Since such processing of rotation itself has been known well in general, it is not described in detail here.

Although a portion of the input image has been regarded as the objective area 710 to be corrected in the above-mentioned embodiment, and correction operation has been performed upon image data in this objective area 701, the whole of the input image may be rotated on the basis of the inclination of the image detected in the objective area 701.

As has been described, according to the present invention, an input image is divided into a plurality of rectangular blocks, and shape information showing characteristics of the image is detected every block to thereby detect the inclination of the input image. Consequently, it is possible to judge the inclination of the image from the information of a portion of the input image, and it is possible to perform correction easily upon a cut of the input image, or an image having no rectangular frame.

What is claimed is:

1. An image signal processing apparatus comprising:
   image information reading means for reading image information;
   image signal display means for displaying an image signal of the image information read by said image information reading means;
   blocking means for superimposing a plurality of blocks constituted by a predetermined number of picture elements over the image information read by said image information reading means;
   block shape analyzing means for analyzing shapes of images in said respective blocks to detect shapes having orientation information;
   display means for displaying the shapes having orientation information detected by said block shape analyzing means at positions corresponding to blocks which the shapes having orientation information belong to; and
   position instruction means for inputting positions in an image of said image signal displayed by said image signal display means to correct an inclination of the image signal;
   whereby the shapes having orientation information highlight the inclination of the image data.

2. The image signal processing apparatus according to claim 1, wherein the display of said image signal display means includes a reference line on inclination.

3. The image signal processing apparatus according to claim 1, wherein the input image signal to be corrected corresponds to said plurality of blocks.

4. The image signal processing apparatus according to claim 1, wherein the whole of the input image signal is corrected in accordance with the instructions from said position instruction means.

5. The image signal processing apparatus according to claim 1, wherein said block shape analyzing means is means for detecting a direction of an image on the basis of distribution of density of picture elements in each block.

6. The image signal processing apparatus according to claim 5, wherein said display means for displaying the block shapes is means for displaying symbols typically showing the direction of said image in each block.
   image information storage means for storing said image information.

7. An image signal processing apparatus comprising:
   image information reading means for reading image information;
   image information storage means for storing said image information;
   block extracting means for extracting rectangular blocks constituted by a predetermined number of picture elements sequentially from said image information read by said image information reading means;
   block shape analyzing means for analyzing shapes of images in said extracted blocks to detect shapes having orientation information;
   block shape storage means for storing said shapes having orientation information;
   image signal display means for displaying an image signal of said image information read from said image information storage means;
   position instruction means for inputting positions on said image signal display means to correct an inclination of the image signal; and
   display means for displaying the shapes having orientation information read from said block shape storage means at positions corresponding to blocks which the shapes having orientation information belong to;
   whereby the shapes having orientation information highlight the inclination of the image data.

8. The image signal processing apparatus according to claim 7, wherein the display of said image signal display means includes a reference line on inclination.

9. The image signal processing apparatus according to claim 7, wherein the input image signal to be corrected corresponds to said plurality of blocks.

10. The image signal processing apparatus according to claim 7, wherein the whole of the input image signal is corrected in accordance with the instructions from said position instruction means.

11. The image signal processing apparatus according to claim 7, wherein said block shape analyzing means is means for detecting a direction of an image on the basis of the distribution of density of picture elements in each block.

12. The image signal processing apparatus according to claim 11, wherein said display means for displaying the block shapes is means for displaying symbols typically

* * * * *

UNITED STATES PATENT AND TRADEMARK OFFICE
CERTIFICATE OF CORRECTION

PATENT NO. : 5,446,803
DATED : August 29, 1995
INVENTOR(S) : Setsu KUNITAKE et al It is certified that error appears in the above-indentified patent and that said Letters Patent is hereby corrected as shown below:

Claim 6, Col. 10, lines 8-9, delete "image information storage means for storing said image information."

Claim 12, Col. 10, lines 56-57, after "typically", insert --showing the direction of said image in each block--.

Signed and Sealed this

Twentieth Day of August, 1996

Attest:

BRUCE LEHMAN

*Attesting Officer*    *Commissioner of Patents and Trademarks*